United States Patent [19]

Andoh et al.

[11] Patent Number: 5,043,566
[45] Date of Patent: Aug. 27, 1991

[54] MONITOR MECHANISM FOR USE WITH A SCANNING OPTICAL APPARATUS WITH COMPOSITE DRAWING A MONITORING BEAMS

[75] Inventors: Hiroaki Andoh; Michio Ohshima; Yuji Matsui; Takashi Okuyama; Toshitaka Yoshimura; Hidetaka Yamaguchi; Yasushi Ikeda; Jun Nonaka; Tamihiro Miyoshi; Mitsuo Kakimoto; Masatoshi Iwama; Hideyuki Morita; Satoru Tachihara; Akira Morimoto; Akira Ohwaki, all of Tokyo, Japan

[73] Assignee: Asahi Kogaku Kogyo Kabushiki Kaisha, Tokyo, Japan

[21] Appl. No.: 444,204

[22] Filed: Dec. 1, 1989

[30] Foreign Application Priority Data

Dec. 1, 1988 [JP] Japan ................................. 63-304783

[51] Int. Cl.⁵ ............................................. H01J 40/14
[52] U.S. Cl. ............................. 250/206.1; 219/121.8; 250/225
[58] Field of Search ............... 250/202, 216, 225, 234, 250/235, 206.1; 318/577; 350/380, 382, 402, 405, 407; 219/121.78, 121.79, 121.8, 121.81

[56] References Cited

U.S. PATENT DOCUMENTS 4,695,698 9/1987 Mayor et al. .................... 219/121.8

Primary Examiner—David C. Nelms
Attorney, Agent, or Firm—Sughrue, Mion, Zinn, Macpeak & Seas

[57] ABSTRACT

A monitor mechanism for use with a scanning optical apparatus in which the direction of polarization is utilized to separate a source laser light beam into a pattern drawing and a monitor beamlet and to synthesize them again into a single after passing through a scanning lens and beam deflector. The two beamlets can thus be controlled so as to project towards the deflector and scanning lens in the same direction, which is effective in reducing the offset between the pattern drawing and monitor beams that may occur on account of such factors as variations in lens performance.

3 Claims, 11 Drawing Sheets

MONITOR MECHANISM FOR USE WITH A SCANNING OPTICAL APPARATUS WITH COMPOSITE DRAWING A MONITORING BEAMS

BACKGROUND OF THE INVENTION

The present invention relates to a monitor mechanism for use with a scanning optical system such as a laser printer which draws patterns by scanning with laser light. This mechanism is used to detect the position of scanning by a light beam.

In conventional scanning pattern drawing apparatuses such as laser printers, a photodetector is provided in the scanning optical system at a position that is optically conjugate with the drawing surface and which is ahead of the letter in the direction of beam tracing, and the output produced by the photodetector when it is traversed by light beam is used as a vertical sync signal for the scanning optical system in order to control operations such as READ timing.

However, this arrangement is not capable of attaining a high precision of pattern drawing due to the lack of any way of correcting the timing of pattern drawing operations within a scanning field or sub-field so as to correct, for example, for fluctuations in the speeds of system motors.

With a view to solving this problem, it has been proposed that a monitor beam be employed in addition to the pattern drawing beam to perform simultaneous scanning with the pattern drawing beam. The position of scanning with the monitor beam is detected at a position optically equivalent (conjugate) to the drawing surface to insure constant detection of the position where the drawing beam is describing a pattern on said surface.

In the conventional method, however, the pattern drawing and monitor beams are projected in different directions into a deflector and a scanning lens so that the two beams are spatially isolated, with the monitor beam being reflected by a mirror to be guided into a detection system. Because of this arrangement, if the difference in the position of incidence into the scanning lens causes such an adverse effect as operational errors, the position of scanning by the pattern drawing beam cannot be correctly detected from the position of the monitor beam, which presents a substantial problem if patterns must be described with high precision.

SUMMARY OF THE INVENTION

Under the circumstances described above, it is an object of the present invention to provide a monitor mechanism that insures correct detection of the pattern drawing position by attaining the best possible match between the conditions of a pattern drawing beam and a monitor beam, which beams are separated from a common light source. Further, the two beams can be projected into a deflector and a scanning lens in the same direction.

In a monitor mechanism of the present invention which attains the above-stated object the light beam issuing from a laser light source is divided into a pattern drawing beamlet and a monitor beamlet by means of a beam splitter. The directions of the two beamlets are rotated by means of a phaser so that they cross each other at right angles. The two beamlets are synthesized into a single beam on the same optical path by means of a first polarizing beam splitter. The single composite beam is deflected with a deflector and converged by passage through a scanning lens. The beam is separated again into the pattern drawing and monitor beams by means of a second polarizing beam splitter, and the pattern drawing beamlet is directed to the drawing surface whereas the monitor beamlet is directed to a monitor detecting system.

As described above, the monitor mechanism of the present invention is constructed so that the direction of polarization is utilized to separate the light beam into a pattern drawing and a monitor beamlet and to synthesize them into a single beam, or vice versa. Consequently, the two beamlets can be controlled so as to project into a deflector and a scanning lens in the same direction, which is effective in reducing the offset between the pattern drawing and monitor beams that may occur on account of such factors as variations in lens performance. Hence, the position of scanning by the pattern drawing beamlet can be correctly detected from the position of the monitor beamlet, thus enabling various kinds of corrections to be effected in a scanning field or subfield with high precision.

Further, the position of the pattern drawing beamlet is constantly detected so that nonuniform rotation of motors can be compensated on a real-time basis, even if the scanning lens does not have high linearity with respect to the deflection characteristics of the deflector. This is effective in preventing deterioration of the pattern drawing characteristics.

DESCRIPTION OF THE PREFERRED EMBODIMENTS

Figure 1:
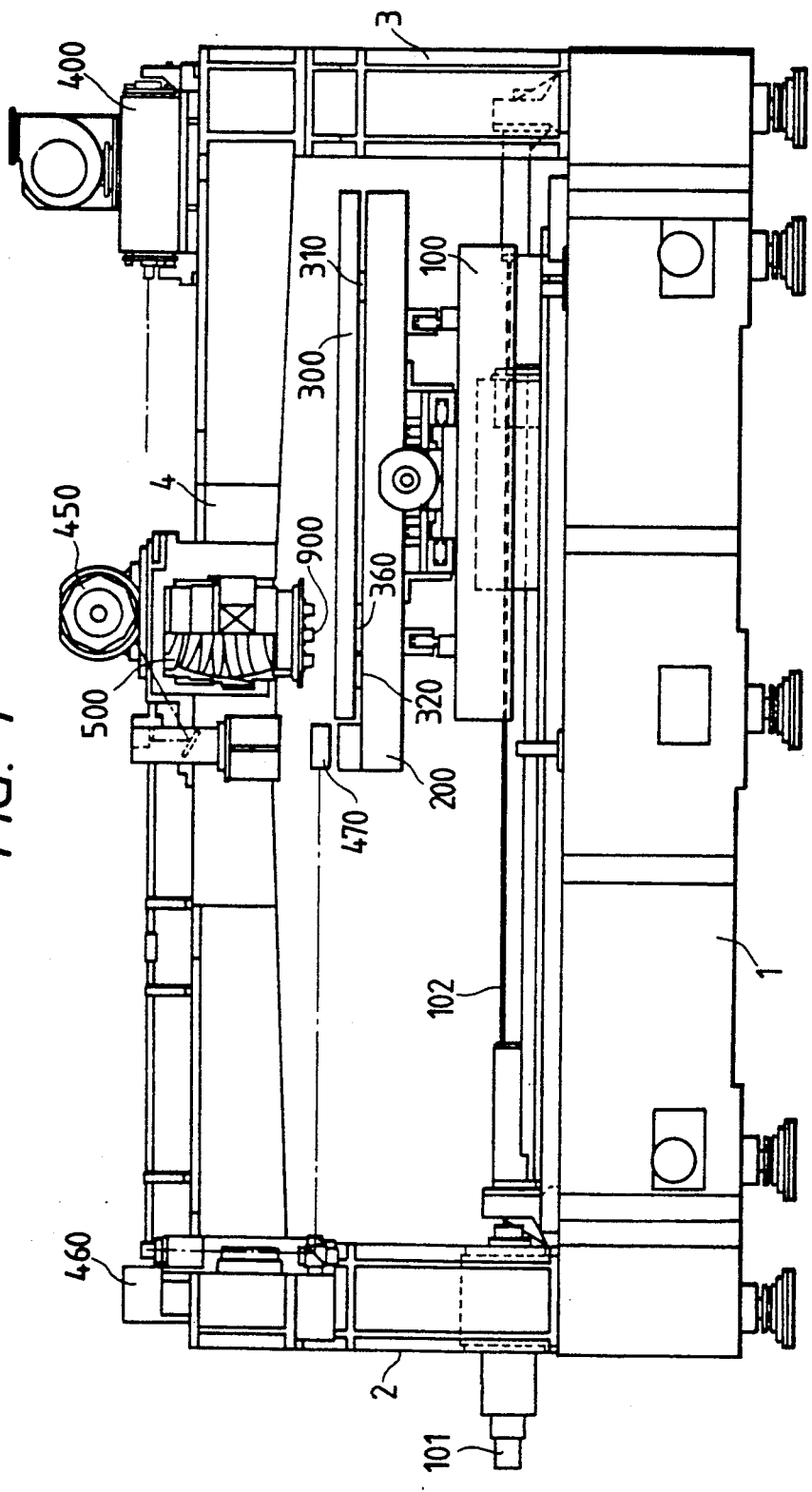
FIG. 1 is a side view of a laser photoplotter incorporating a drawing surface adjusting mechanism according to a preferred embodiment of the present invention.

The drawing surface adjusting mechanism of the present invention will be described hereinafter with reference to a preferred embodiment described with reference to the case of a laser photoplotter which draws a precise pattern on a workpiece such as a photographic film.

Figure 2:
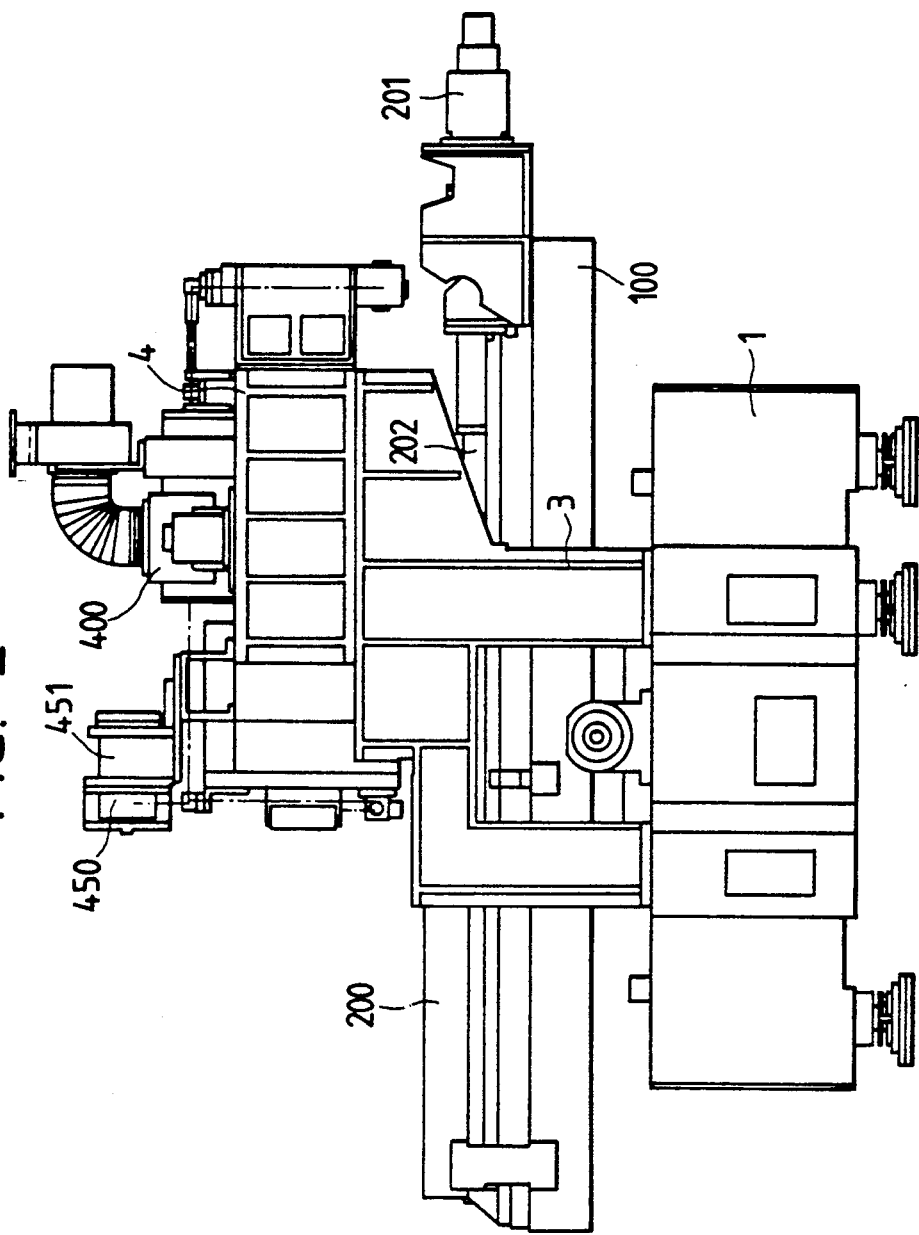
FIG. 2 is a front view of the same laser photoplotter.
Figure 3:
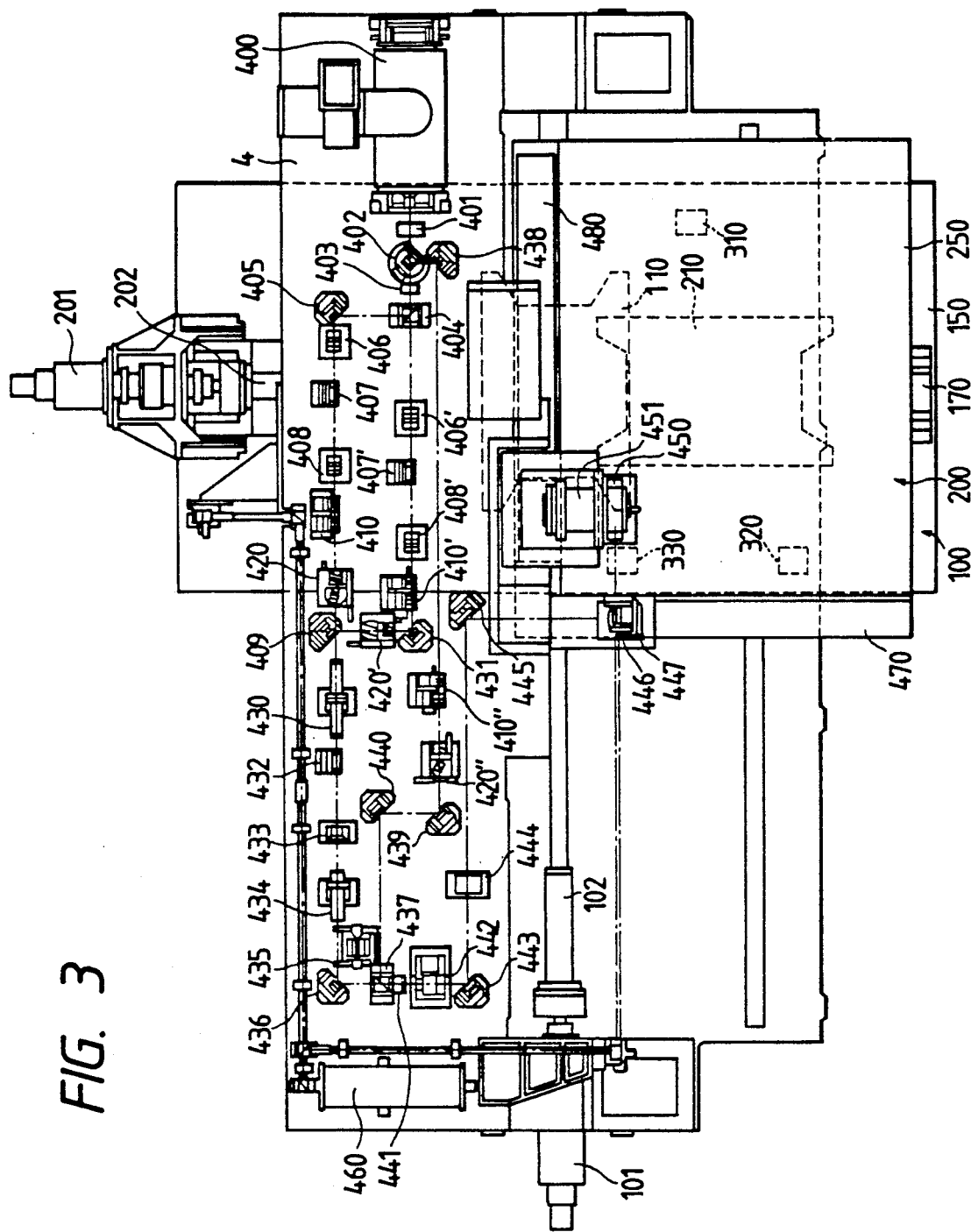
FIG. 3 is a plan view of the same laser photoplotter.

The overall system of the apparatus is first described schematically with reference to FIGS. 1 to 3.

The apparatus is composed basically of a main body 1 having an X table 100 and a Y table 200 disposed thereon and an optical head unit 4 secured above the tables by support columns 2 and 3 located at opposite ends of the length of the main body 1. The X table 100 is adapted to be slidable unidirectionally on the frame of the main body 1 and driven with an X-axis motor 101 via a ball screw 102. The Y table 200 is adapted to be slidable along guide rails on the X table 100 and driven with a Y-axis motor 201 via a ball screw 202. As shown in FIG. 3, a drawing board 300 on the Y table is supported by three AF drive units 310, 320 and 330 in such a way that it is capable of vertical movements and tilting.

The optical head unit 4 contains scanning optical elements such as a polygonal mirror 450 for deflecting the beam from a scanning laser 400 and an fθ lens 500 by which the beam reflected from the polygonal mirror 450 is converged on the drawing surface. A laser-operated measuring device is also provided for exact positioning of the tables. This device has a known construction in which the beam from a laser 460 is divided into two components, one being reflected from an X-axis mirror unit 470 fixed to the Y table 200 and the other being reflected from a Y-axis mirror 480 also fixed to the Y table 200, with the reflected beam being detected for measuring the amounts of displacement of the respective tables. The polygonal mirror 450 is secured to a spindle unit 451 at one end of the optical head unit 4 and is freely rotatable in a plane perpendicular to the drawing board 300.

As in the apparatus of the present invention, a conventional system of drawing patterns by vector scanning also used an XY coordinate table. However, because the beam direction was fixed, the action of the two axes was totally mechanical, resulting in slow drawing speeds. An improved system was therefore developed by adapting the tables to be driven on a single axis. In the improved system, the tables are caused to slide in only one direction and patterns are described by raster scanning the drawing surface with an optical head designed as a scanning optical system. However, the conventional raster scanner is intended to draw patterns with a comparatively low precision and the diameter of the beam spot, which determines the minimum line width, is approximately 30 μm. If more precise pattern drawing is required, a brighter scanning lens having a shorter focal length and hence a smaller F number must be employed to reduce the spot size. In this case though, if the scanning angle is the same, the scan width is reduced, and so is the depth of focus.

To deal with this problem, the apparatus of the embodiment under consideration is so designed that instead of covering the whole width of the drawing surface in the direction of main scanning by a single stroke of scanning, the width is divided into a plurality of lanes, and the tables are driven about two axes to insure that a pattern can be drawn over the entire width in the main scanning direction by several strokes of scanning. In this connection, it should be mentioned that the apparatus of the present invention which basically relies upon raster scanning does not need to drive the tables in both directions as in the conventional vector scanner, and the driving about each axis during pattern drawing is effected in only one direction to eliminate the possible effects of backlash.

The problem of small depth of focus is solved in the present invention by providing an auto focus (AF) mechanism and vertically moving the drawing board 300 with respect to the optical head unit 4 so that it will always be held at the appropriate position. As a result, there is some sacrifice in the image forming speed, but generally high speed image formation is possible.

The basic operation of the system is as follows.

The X table 100 moving with respect to the fixed optical head unit 4 is scanned with a beam spot for pattern drawing. When scanning in the X-axis direction for covering a predetermined width is completed, the Y table 200 is moved by an amount corresponding to this scan width and the X table 100 is returned to the same position as it was when the writing operation started. Movement of the X table 100 is resumed and pattern is drawn on the workpiece by continued scanning.

The layout of the optical elements used in the embodiment under consideration is described hereinbelow with reference to FIGS. 3 and 4, the latter being a perspective view showing schematically only the optical elements depicted in FIG. 3. Like elements are identified by like reference numerals in the two drawings.

The photoplotter under consideration splits the laser beam from the scanning laser 400 into three beamlets, two of which are used to form two spots on the drawing surface and the remainder is used as monitor light for detecting the exact positions of these spots. In response to the rotation of the polygonal mirror 450, the two spots on the drawing surface scan simultaneously those areas on adjacent scanning lines which are spaced apart in the direction of main scanning. Spacing is provided in the main scanning direction since the distance between adjacent scanning lines is set at a smaller value than the diameter of beam spot in order to insure precise pattern drawing, and unless spacing is provided in the main scanning direction, two spots can partly overlap to introduce instability in the drawing performance by interference.

A polarizing beam splitter which polarizes two light beams in directions that cross each other at right angles is commonly used to synthesize such beams in one optical path. However, if it is desired to divide the beam issuing from a single light source into three parts and recombine them into a single beam so that it can be scanned by the same deflector as in the case described immediately above, the method of performing splitting and synthesizing operations solely on the basis of the direction of polarization is by no means effective.

Figure 4:
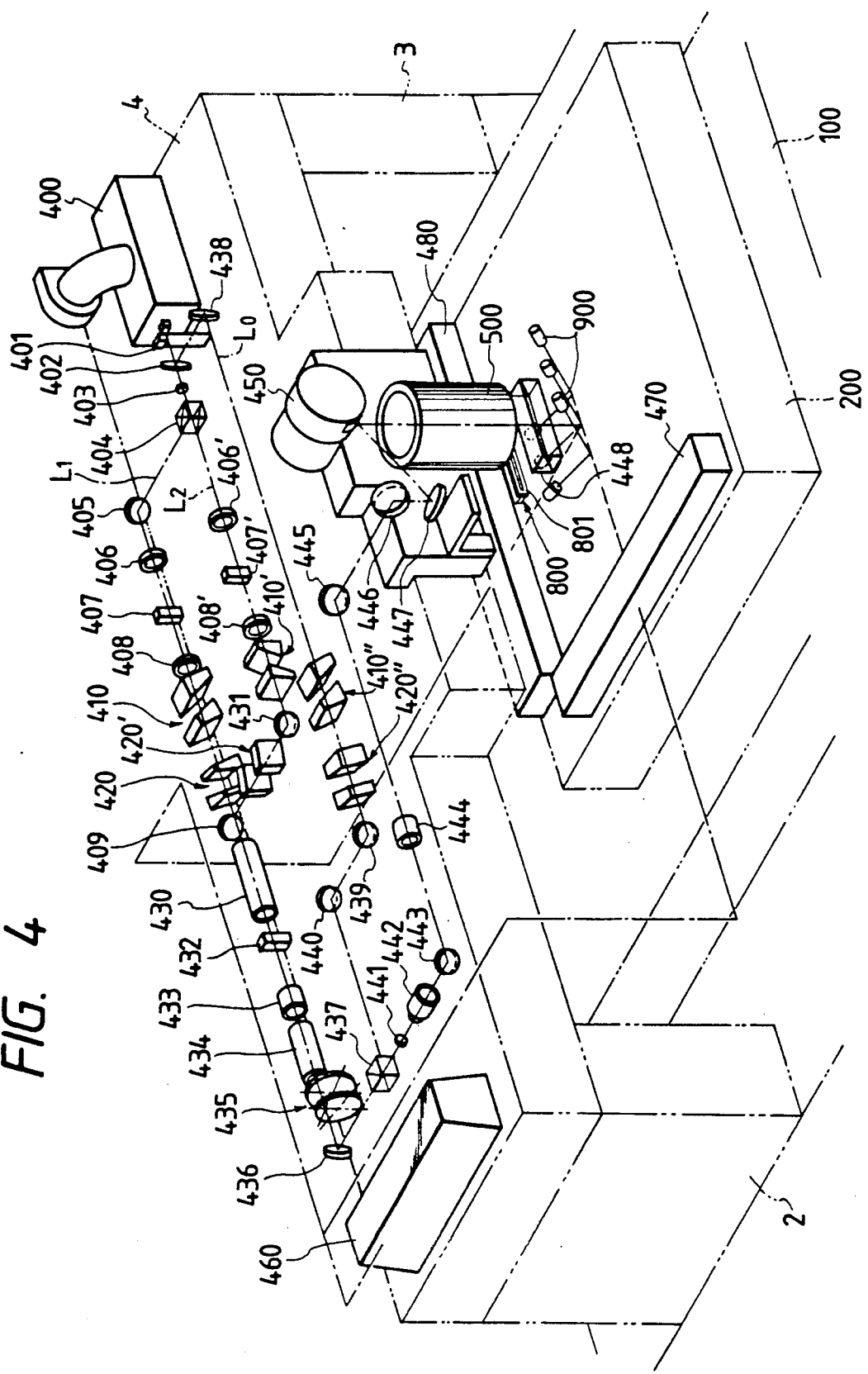
FIG. 4 is a perspective view showing schematically the layout of the optical elements used in the laser photoplotter of FIG. 1.

The optical system shown in FIGS. 3 and 4 uses a special technique to overcome the difficulty described above. According to this technique, pattern drawing light beams are distinguished from a monitor beam by making use of polarization, and the two pattern drawing beams are directed to the same lens but in different directions so as to synthesize them in the same optical path. This method of synthesis is permissible since, as already mentioned, pattern drawing spots are formed in areas that are spaced in the direction of main scanning.

Laser light issuing from the scanning laser 400 passes through a shutter 401 and is divided into two parts by passage through a 5% reflecting half-silvered mirror 402. The laser light reflected from this half-silvered mirror 402 is used as monitor light L0. Laser light transmitted by the half-silvered mirror 402 has its direction of polarization rotated through 90° by means of a first half-wavelength plate 403 so that it will be directed toward an acousto-optical (AO) modulator (ultrasonic optical modulator) as an S-polarized component. This light is further divided into parts by a first beam splitter 404 capable of 50% reflection (i.e., 50% transmission). The resulting two beamlets are used as pattern drawing light for forming two spaced spots on the drawing surface.

A first pattern drawing beamlet L1 reflected from the first beam splitter 404 is further reflected by a beam bender 405 and condensed by a lens 406 to converge at the position of a first pattern drawing AO modulator 407. The AO modulator 407 receives laser light incident in a direction that satisfies the Bragg condition and diffracts this incident light in response to an ultrasonic electric input signal into the transducer. By turning on and off the ultrasonic input, the laser light launched into the AO modulator 407 can be changed from light of the zero-th order to light of the first order (primary light) and vice versa, and the primary light is used as a pattern drawing beams. The AO modulator 407 is controlled by a WRITE signal containing information as to dot exposure to be performed on the drawing surface.

The modulated ON light (primary light) is collimated by a lens 408 behind the AO modulator 407 and the resulting parallel beam is deflected through a predetermined angle as it passes through a first and a second unit 410 and 420 for fine tuning the optical axis, each of the units 410 and 420 being composed of two prisms. The deflected light is directed to a first lens unit 430 after traveling very close to the edge of a beam bender 409.

A second pattern drawing beamlet L2 transmitted by the first beam splitter 404 is converged by passage through a lens 406' and directed into a second pattern drawing AO modulator 407'. The function of the AO modulator 407' is the same as that of the first pattern drawing AO modulator 407 except that it is driven by a signal for scanning one line away from the line to be scanned by the input signal to the first pattern drawing AO modulator 407.

The primary light emerging from the second pattern drawing AO modulator 407' is passed through a lens 408' and deflected by a predetermined angle as it passes through a third unit 410' for fine tuning the optical axis, a beam bender 431, and a fourth unit 420' for fine tuning the optical axis. Each of the axis tuning units 410' and 420' is composed of two prisms. The deflected primary light is reflected by the edge of the beam bender 409 and launched into the first lens unit 430.

The lenses 406 and 406' have compositions shown in Table 1 below, and the lenses 408 and 408' have compositions shown in Table 2 below. In these tables, f signifies the focal length of the lens, $r_i$, the radius of curvature of the i-th surface, $d_i$, the distance (lens thickness or aerial distance) between the i-th and (i+1)-th surfaces, and $n_i$, the refractive index of the medium between the i-th and (i+1)-th surfaces at the operating wavelength.

In order to separate a plurality of spots on the image plane by small amounts while ensuring high convergence of each spot, the scanning light beams must be synthesized at the same position on the deflector in such a way that they have sufficiently small angles. To this end, fine setting and adjustment of both angle and position are necessary. Particularly close tolerances must be met in the angular direction since an error in that direction is multiplied on the image plane. Satisfactory precision cannot be attained by adjustment with mirrors.

Thus, as already described above, two units for fine tuning the optical axis are provided for each optical path in the system under consideration for the purpose of adjusting the direction of light beams and the amount of their shift in small pitches. For the same reason, a fifth and a sixth units 410" and 420" for fine adjusting the optical axis are provided for the monitor light L0.

Figure 5:
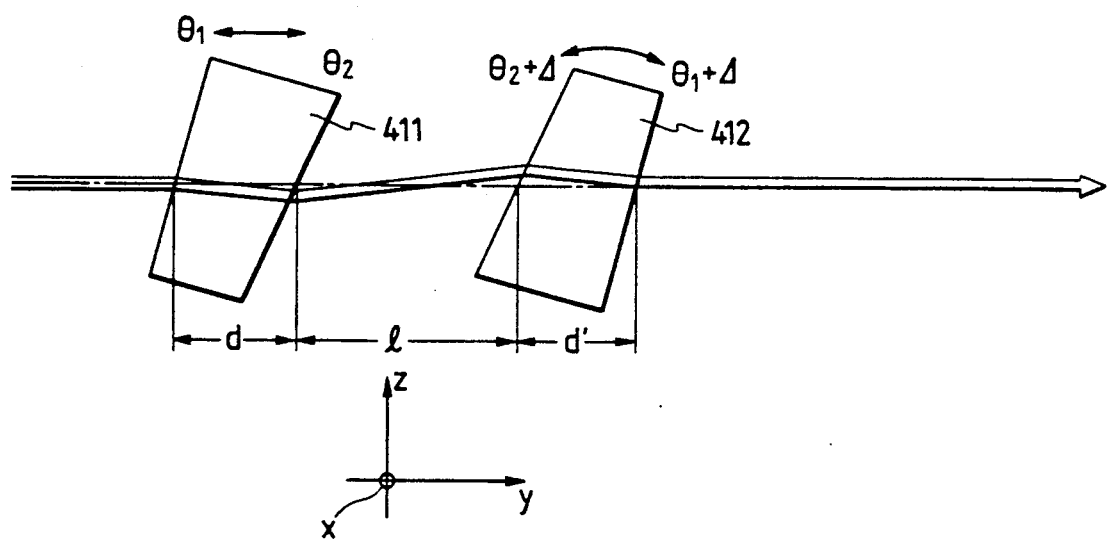
FIGS. 5 and 6 are illustrations showing the layout of prisms that may be used in the above embodiment of the present invention.
Figure 6:
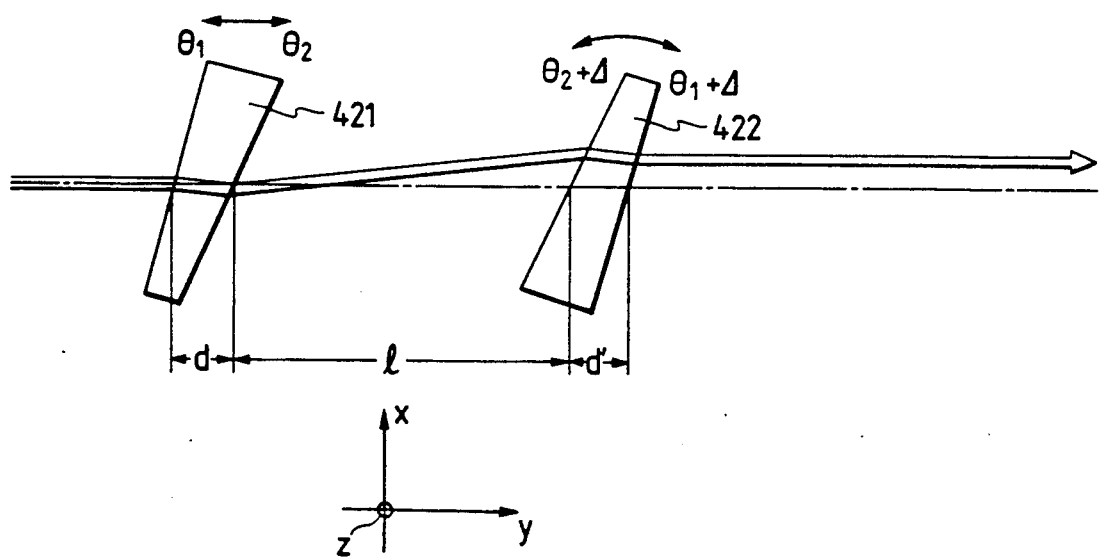
Figure 14:
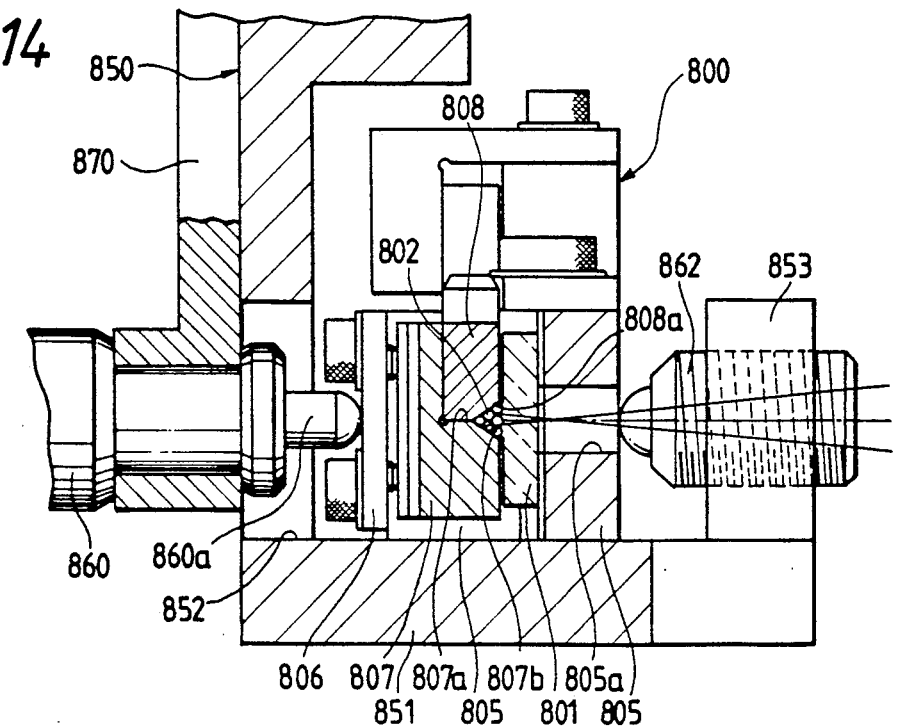
FIG. 14 is a cross section of FIG. 10 as seen looking in the direction indicated by arrows XIV.

The first and second prisms 411 and 412 in the first tuning unit 410 have the composition shown in FIG. 14 and Table 3, whereas the first and second prisms 421 and 422 in the second tuning unit 420 have the composition shown in FIG. 6 and Table 4. FIG. 5 is a cross section of the optical head unit 4 taken through the X-Z plane perpendicular to the top of the head unit, and FIG. 6 is a cross section of the same head unit taken through the X-Y plane parallel to its top. The prisms in the first optical axis tuning unit 410 are not inclined to the direction of incident light in the X-Y plane and hence will take no part in deflection in this plane. Similarly, the prisms in the second optical axis tuning unit 420 take no part in deflection in the Y-Z plane.

In order to ensure that the prisms will satisfy the settings shown in FIGS. 5 and 6 and in Tables 3 and 4, the first prism 411 in the first optical axis tuning unit 410 is made slidably adjustable in the direction of the optical axis and the second prism 412 is made pivotally adjustable about the pivotal axis parallel to the X axis. Further, the first prism 421 in the second optical axis tuning unit 420 is made slidably adjustable in the direction of the optical axis and the second prism 422 is made pivotally adjustable about the pivotal axis parallel to the Z axis. Details of the mechanisms for effecting the necessary adjustments will be described below. In the example at hand the first and second pattern drawing light beams L1 and L2 are oriented so that their central axes form an angle of 0.27° in the direction of main scanning and an angle of 0.034° in the sub-scanning direction, and so that they are directed toward the first lens unit 430 from a position distant by 3.8 mm and 0.48 mm in the main and sub-scanning directions, respectively.

The first lens unit 430 which admits the light beams reflected from the tuning units 420 and 420' is a positive lens unit composed of a positive, a negative and a position element as shown in Table 5. This lens unit converges the incident laser light. A compensating AO modulator 432 which compensates for the effect caused by the tilting of the polygonal mirror 450 is provided ahead of the point of condensation by the first lens unit 430 as spaced by an aerial distance of 62 mm.

The pattern drawing laser light issuing from the compensating AO modulator 432 passes through a relay lens unit composed of a positive and a negative element as shown in Table 6 and is thereafter directed toward a second lens unit 434 composed of a negative and a positive element as shown in Table 7.

The amplitude of the pattern drawing laser light collimated again by the second lens unit 434 is adjusted by a variable filter unit 435 and the light is reflected from a beam bender 436 to enter a first polarizing beam splitter 437 where it is combined with the monitor light. The monitor light which was reflected from the half-silvered mirror 402 is further reflected by a beam bender 438 and deflected a predetermined angle by the fifth and sixth optical axis tuning units 410" and 420". The deflected light is reflected from beam benders 439 and 440 and directed as an S-polarized component to the first polarizing beam splitter 437 for reflection.

The two pattern drawing beams are polarized by the first half-wavelength plate 403 for a different direction than the monitor light and are directed as a P-polarized component to the first polarizing beam splitter 437 for transmission.

The two pattern drawing beams and the monitor beam have their polarizing direction rotated through 90° by a second half-wavelength plate 441 and are passed successively through a third lens unit 442 composed of a negative, a positive, a negative and a positive element as shown in Table 8, a beam bender 443 and a fourth lens unit 444 composed of two positive elements, as indicated in Table 9. The beams emerging from the fourth lens unit 444 are passed through three beam benders 445, 446 and 447 and directed toward the polygonal mirror 450 by which they are reflected and deflected.

The first and second lens units 430 and 434 form a first beam expander unit capable of ×1.67 magnification, which enlarges a beam of $0.7\phi$ to $1.17\phi$. The third and fourth lens units 442 and 444 form a second beam expander unit capable of ×21.4 magnification which enlarges the two pattern drawing beams from a spot of $1.17\phi$ to $25\phi$.

The relay lens unit 433 takes no part in the magnifications of these beam expander units; instead it renders the compensating AO modulator 432 conjugative with the reflecting surfaces of the polygonal mirror 450 and compensates not only for the tilting of the polygonal mirror but also for any consequent beam shift that occurs on the polygonal mirror.

The reflecting surfaces of the polygonal mirror 450 are subject to a tilting error, i.e., an inclination to the axis of rotation, on account of machining error or some other factor, and each time a different reflecting surface is used the scanning line will deviate in the direction of sub-scanning, which is normal to the direction of scanning by a beam spot. If an AO modulator is merely provided between the light source and the deflector to effect fine deflection of the angle of incidence in the sub-scanning direction, the angular deviation of incident light due to tilting can be corrected, but then a lateral shift occurs in the reflected light. This lateral shift will cause the incident light on the $f\theta$ lens to deviate in the sub-scanning direction and problems may arise such as deterioration of lens performance, curvature of the scanning line, and even occasional vignetting by the lens barrel.

In order to avoid these problems, the compensating AO modulator 432 and the polygonal mirror 450 in the system under consideration are designed to be optically conjugative to each other. The term "optically conjugative" does not necessarily mean that the two devices satisfy an "imaging" relationship, but it is to be understood that as far as the principal rays are concerned, an angular deviation of light will not result in positional deviation.

The reflected beams from the polygonal mirror 450 are converged by the $f\theta$ lens 500 with a focal length of 151 mm, as specified in Table 10. The pattern drawing beams are transmitted by a second polarizing beam splitter 448 to form two spots with a diameter of 5 μm on the drawing surface. These two spots are spaced apart by a distance of 20 μm in the main scanning direction and by 2.5 μm in the sub-scanning direction, the latter being equal to the inter-line gap.

The monitor light which is directed as an S-polarized component to the beam splitter 448 is reflected therefrom and directed toward a monitor detecting unit 800 having a scale 801 for scan correction. As will be described below, the monitor detecting unit 800 detects the change in the amount of transmission of the beam which scans the scale 801 and outputs a pulse having a frequency proportional to the scan speed.

Reference numeral 900 denotes a focus detecting mechanism composed of three pairs of light-emitting light-detecting elements. As will be described hereinafter, this mechanism detects the reflected light from the drawing surface and determines if it is within the depth of focus of the $f\theta$ lens 500.

TABLE 1

| Lenses 406 and 406' (each composed of a single element) $f = 130.02$ | | | |
|---|---|---|---|
| i | $r_i$ | $d_i$ | $n_i$ |
| 1 | 98.137 | 3.60 | 1.80593 |
| 2 | 1520.979 | | |

The aerial distance from the second surface of each lens to the surface of the associated pattern drawing AO modulator is 127.89.

TABLE 2

| Lenses 408 and 408' (each composed of a single element) $f = 130.02$ | | | |
|---|---|---|---|
| i | $r_i$ | $d_i$ | $n_i$ |
| 1 | −1520.979 | 3.60 | 1.80593 |
| 2 | −98.137 | | |

The aerial distance from the pattern drawing AO modulator to the first surface of each lens is 127.89.

TABLE 3

| First optical axis tuning unit 410 (two-unit-two-element) | | | | |
|---|---|---|---|---|
| i | $r_i$ | $d_i$ | $n_i$ | main scanning angle | sub-scanning angle |
| 1 | ∞ | 10.00 | 1.52177 | 0° | −15.00° |
| 2 | ∞ | 18.86 | | 0° | −25.00° |
| 3 | ∞ | 10.00 | 1.52177 | 0° | −25.24° |
| 4 | ∞ | | | 0° | −15.24° |

The aerial distance from the second surface of lens 408 to the first surface of the tuning unit is 93.93.

TABLE 4

| Second optical axis tuning unit 420 (two-unit-two-element) | | | | |
|---|---|---|---|---|
| i | $r_i$ | $d_i$ | $n_i$ | main scanning angle | sub-scanning angle |
| 1 | ∞ | 5.00 | 1.52177 | −15.00° | 0° |
| 2 | ∞ | 28.39 | | −25.00° | 0° |
| 3 | ∞ | 5.00 | 1.52177 | −26.82° | 0° |
| 4 | ∞ | | | −16.82° | 0° |

The aerial distance from the fourth surface of the first tuning unit 410 to the first surface of the second tuning unit 420 is 120.00.

TABLE 5

| First Lens unit 430 (three-unit-three-element) $f = 179.99$ | | | |
|---|---|---|---|
| i | $r_i$ | $d_i$ | $n_i$ |
| 1 | 94.500 | 5.74 | 1.80593 |
| 2 | ∞ | 70.14 | |
| 3 | −40.350 | 5.52 | 1.80593 |
| 4 | 67.500 | 82.41 | |
| 5 | 117.000 | 5.15 | 1.80593 |
| 6 | −117.000 | | |

The aerial distance from the fourth surface of the second tuning unit 420 to the first surface of the first lens unit 420 is 150.00, the aerial distance from the sixth surface of the first lens unit 420 to the compensating AO modulator 432 is 54.67, and the aerial distance from the point of condensation by the first lens unit to the modulating surface is 61.95.

TABLE 6

Relay lens unit 433 (two-unit-two-element)
f = 56.18

| i | $r_i$ | $d_i$ | $n_i$ |
|---|---|---|---|
| 1 | 36.000 | 5.00 | 1.80593 |
| 2 | −68.000 | 19.23 | |
| 3 | −26.650 | 5.00 | 1.80593 |
| 4 | 26.650 | | |

The aerial distance from the modulating surface of the compensating AO modulator to the first surface of the relay lens unit is 140.38.

TABLE 7

Second lens unit 434 (two-unit-two-element)
f = 299.99

| i | $r_i$ | $d_i$ | $n_i$ |
|---|---|---|---|
| 1 | −242.198 | 2.50 | 1.80593 |
| 2 | 271.441 | 98.92 | |
| 3 | 780.744 | 4.60 | 1.80593 |
| 4 | −166.058 | | |

The aerial distance between the fourth surface of the relay lens unit and the first surface of the second lens unit is 76.55.

TABLE 8

Third lens unit 442 (four-unit-four-element)
f = 16.16

| i | $r_i$ | $d_i$ | $n_i$ |
|---|---|---|---|
| 1 | −12.181 | 2.86 | 1.66091 |
| 2 | 353.663 | 3.71 | |
| 3 | −83.000 | 4.82 | 1.66091 |
| 4 | −29.440 | 29.30 | |
| 5 | 77.394 | 5.02 | 1.68718 |
| 6 | −480.000 | 2.23 | |
| 7 | 488.111 | 3.44 | 1.68718 |
| 8 | 30.000 | | |

The aerial distance between the fourth surface of the second lens unit 434 and the first surface of the third lens unit 442 is 317.00.

TABLE 9

Fourth lens unit 444 (two-unit-two-element)
f = 346.22

| i | $r_i$ | $d_i$ | $n_i$ |
|---|---|---|---|
| 1 | −238.573 | 4.61 | 1.63182 |
| 2 | −167.164 | 2.21 | |
| 3 | ∞ | 5.00 | 1.63182 |
| 4 | −365.980 | | |

The aerial distance between the eighth surface of the third lens unit 442 and the first surface of the fourth lens unit 444 is 296.94, and the aerial distance from the fourth surface of the fourth lens unit 444 to the polygonal mirror is 1261.00.

TABLE 10 f$\theta$ lens
F/number = 6.0; f = 151.207; 2$\theta$ = 40°
Position of pupil: 94.030 mm ahead of the first surface

| i | $r_i$ | $d_i$ | $n_i$ |
|---|---|---|---|
| 1 | −63.450 | 14.000 | 1.80593 |
| 2 | −155.860 | 6.830 | |
| 3 | −155.000 | 24.750 | 1.80593 |
| 4 | −96.016 | 1.540 | |

TABLE 10-continued f$\theta$ lens
F/number = 6.0; f = 151.207; 2$\theta$ = 40°
Position of pupil: 94.030 mm ahead of the first surface

| i | $r_i$ | $d_i$ | $n_i$ |
|---|---|---|---|
| 5 | −487.370 | 21.700 | 1.80593 |
| 6 | −192.980 | 1.500 | |
| 7 | 684.351 | 20.200 | 1.80593 |
| 8 | −684.351 | 1.500 | |
| 9 | 200.000 | 22.000 | 1.80593 |
| 10 | 312.400 | 24.400 | |
| 11 | 173.534 | 30.000 | 1.80593 |
| 12 | 126.660 | 24.000 | |
| 13 | ∞ | 28.000 | 1.79807 |
| 14 | ∞ | | |

Figure 7:
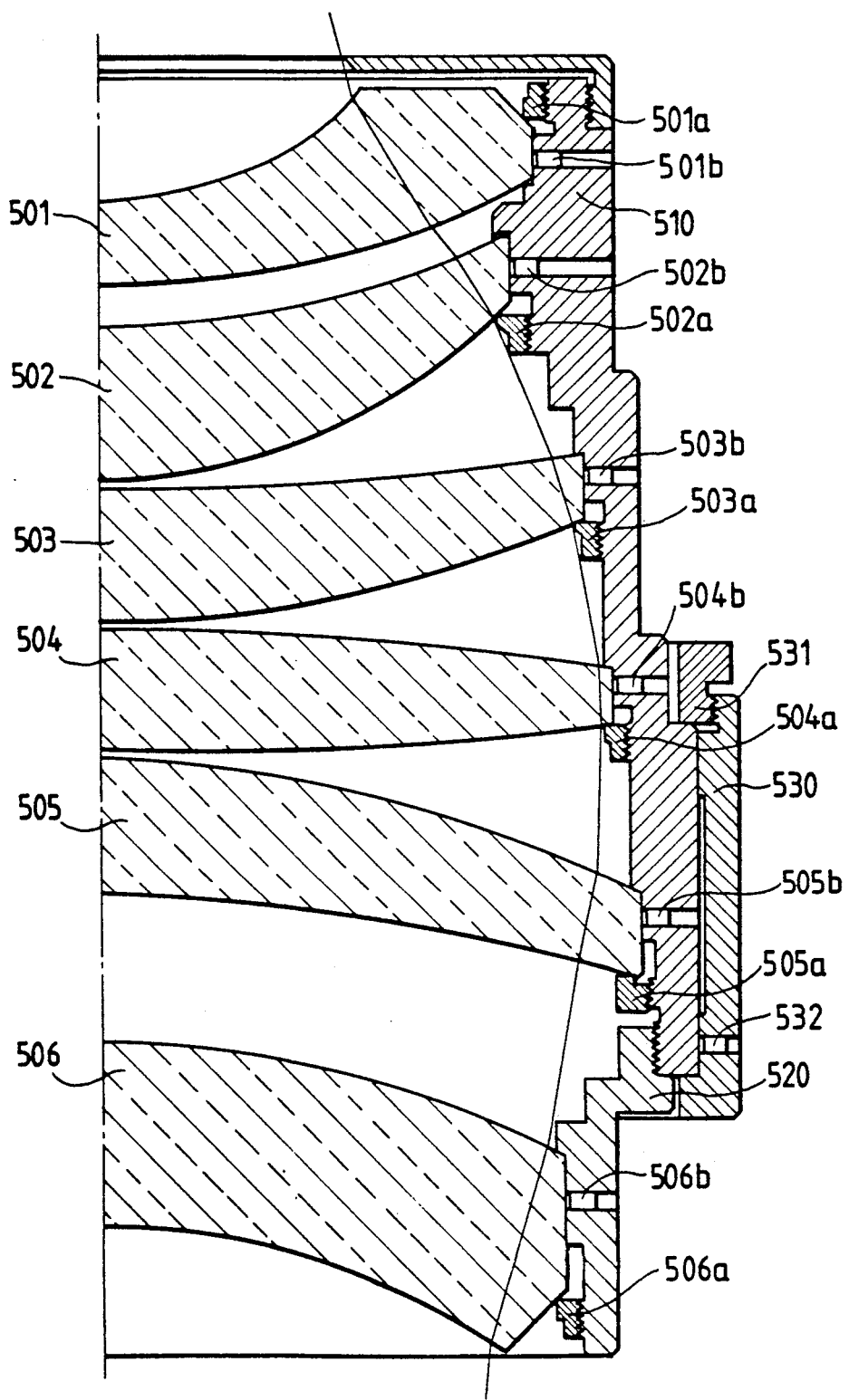
FIG. 7 is a cross-sectional view showing the structure of the $f\theta$ lens support used in the photoplotter of FIG. 1.

The securing of the f$\theta$ lens 500 to the optical head unit 4, as well as the mechanisms of the monitor detecting unit 800 and focus detecting unit 900 positioned adjacent the f$\theta$ lens 500 will now be described. The f$\theta$ lens used in the system under consideration is very bright (F/number=6) and has such a high precision that tolerances for the eccentricity of lens surfaces are very close, with the permissible tilting of a surface being on the order of seconds. However, with an f$\theta$ lens for use in one-dimensional scanning, it is only that part extending along the scan line which will function as an effective lens. Thus, the f$\theta$ lens 500 used in the apparatus according to the embodiment under consideration is provided with a rotating mechanism so that after installation the lens can be rotationally adjusted and fixed at a position where the best lens performance is ensured. This adjusting mechanism is as shown in FIG. 7.

First to fifth lens element 501–505 have their respective edges held between the steps on the main barrel 510 and ring screws 510a–505a and are secured by means of buried bolts 501b–505b in contact with their respective peripheral edge faces. The first lens element 501 is inserted from above as viewed in FIG. 7 and the other lens elements are inserted from below.

A sixth lens element 506 has its edge held between the step on a sub-barrel 520 and a ring screw 506a and is secured by means of a buried bolt 506b in contact with its peripheral edge face. The sub-barrel 520 is mounted by being threaded into the main barrel 510 which is supported by an inward flange formed at the lower end of a cylindrical holder 530 surrounding said main barrel. The upper end of the holder 530 is in threadable engagement with a ring screw 531. This holder 530 is supportably fixed to the optical head unit 4.

Figure 8:
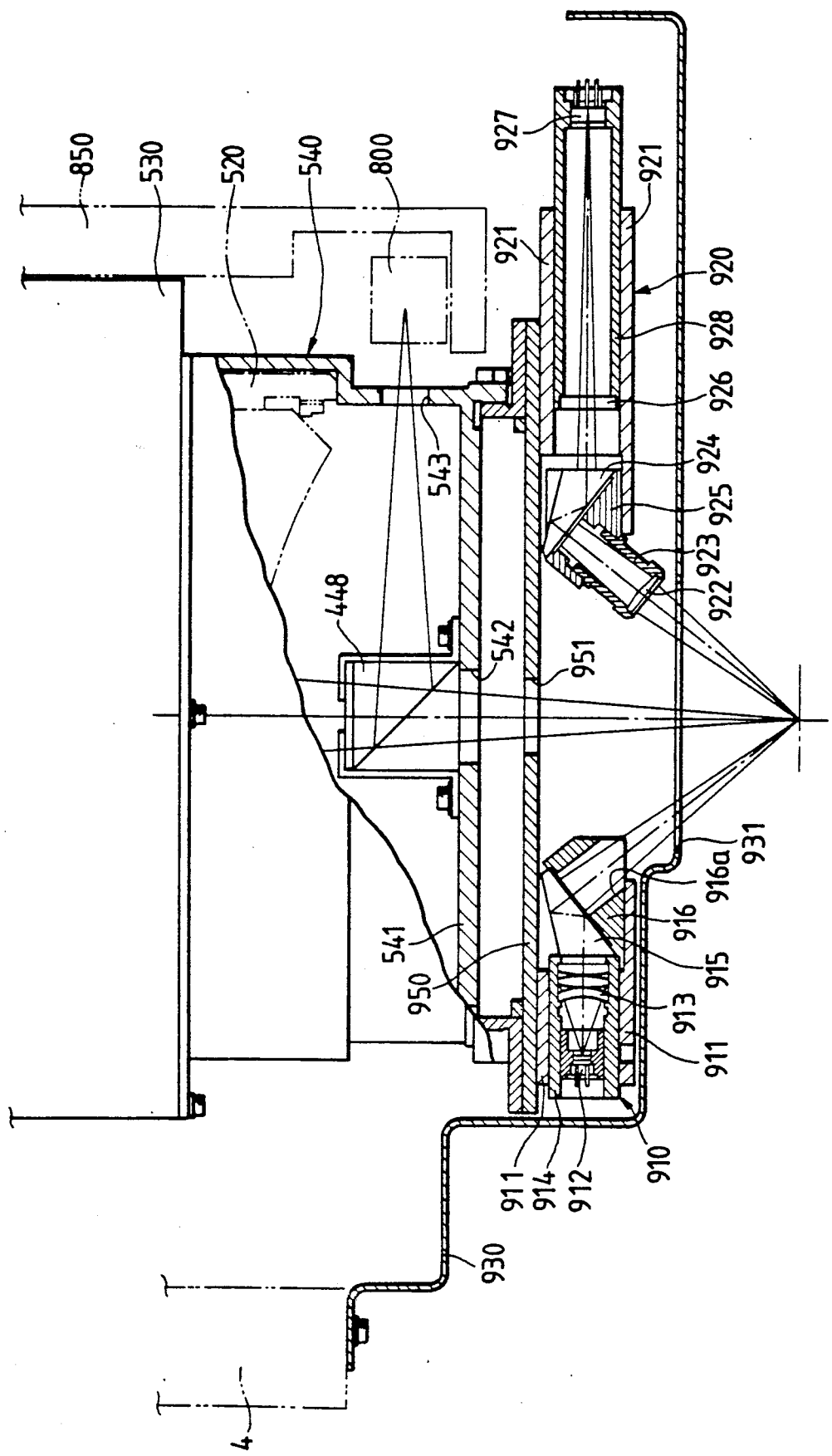
FIG. 8 is a partial fragmentary side view showing the automatic focus (AF) detecting unit used in the above embodiment of the present invention.

For adjusting the f$\theta$ lens 500, the main barrel 510 is manually pivoted to rotate the entire lens unit about the optical axis. When the position that insures the best lens performance is determined, the buried bolt 532 is tightened so as to secure the main barrel 510 to the holder 530. As shown in FIG. 8, the underside of the holder 530 is equipped with a bottomed cylindrical lens cover 540 with a step which covers the lower end of the sub-barrel 520.

The second polarizing beam splitter 448 is positioned in such a way that it covers a long slit 542 made in the bottom wall 541 of the lens cover 540 in the scanning direction. The side wall of the lens cover 540 is provided with a through-hole 543 through which the monitor beam reflected from the second polarizing beam splitter 448 is guided to the outside of the lens cover. The size of the hole 543 should not be smaller than the scan width of the beam. The monitor detecting unit 800 is supported by an arm 850 fixed to the holder 530 and is positioned so as to face the through-hole 543. Below the lens cover 540 are fixed a light-emitting and a light-detecting section 910 and 920 of the focus detecting unit 900 via a support disk 950 which has a slit 951 for transmitting a light beam.

The light-emitting section 910 is composed of a hollow retaining member 911 screwed to the support disk 950, a tubular bush 914 that is fitted into the retaining member 911 and which holds a light-emitting diode (LED) 912 and a projecting lens 913, a prism 915 by which the light beam emerging from the projecting lens 913 in a direction parallel to the drawing surface is reflected toward the latter, and a prism base 916 disposed at one end of the retainer 911 to fix the prism 915 in position. The prism base 916 has a hole 916a formed therein for transmitting the reflected light from the prism 915. As shown in FIG. 8, the light-emitting section is so designed that it emits light which will converge on the drawing surface at the position where the pattern drawing beams are to converge. The LED 912 emits light at a wavelength of 860 nm, which is outside the range of sensitivity of photographic films, light-sensitive materials, etc., onto which the patterns are to be recorded.

The light-detecting section 920 is composed of a hollow retaining member 921 screwed to the support disk 950, a lens barrel 923 for holding a condenser lens 922 provided on the side of the retaining member 921 that is the closer to the light-emitting section 910, a prism 924 by which the direction of the convergent light obtained with the condenser lens 922 is changed to become parallel to the drawing surface, a prism 925 for holding this prism, and a tubular bush 928 that is fitted into the retaining member 921 and which holds an infrared light transmitting filter 926 and a position sensing device (PSD) 927.

The PSD 927 is a one-dimensional sensor that detects the difference in the position of condensation of the beam from the light-emitting section 910 which takes place as the distance to the drawing surface increases or decreases and the detected difference is produced as an output signal from the PSD. This PSD may be replaced by other devices such as a CCD (charge-coupled device). In the example given, a long distance is provided behind the condenser lens 922 in order to amplify the difference in the position of light condensation on the PSD 927. The infrared light transmitting filter 926 is used to improve the S/N ratio of the output from the sensor.

A cover 930 is provided beneath the light-emitting and light-detecting sections 910 and 920 secured to the optical head unit 4. The cover 930 has an aperture 931 which permits the passage of both the pattern drawing beams and the focus detecting beam.

Figure 9:
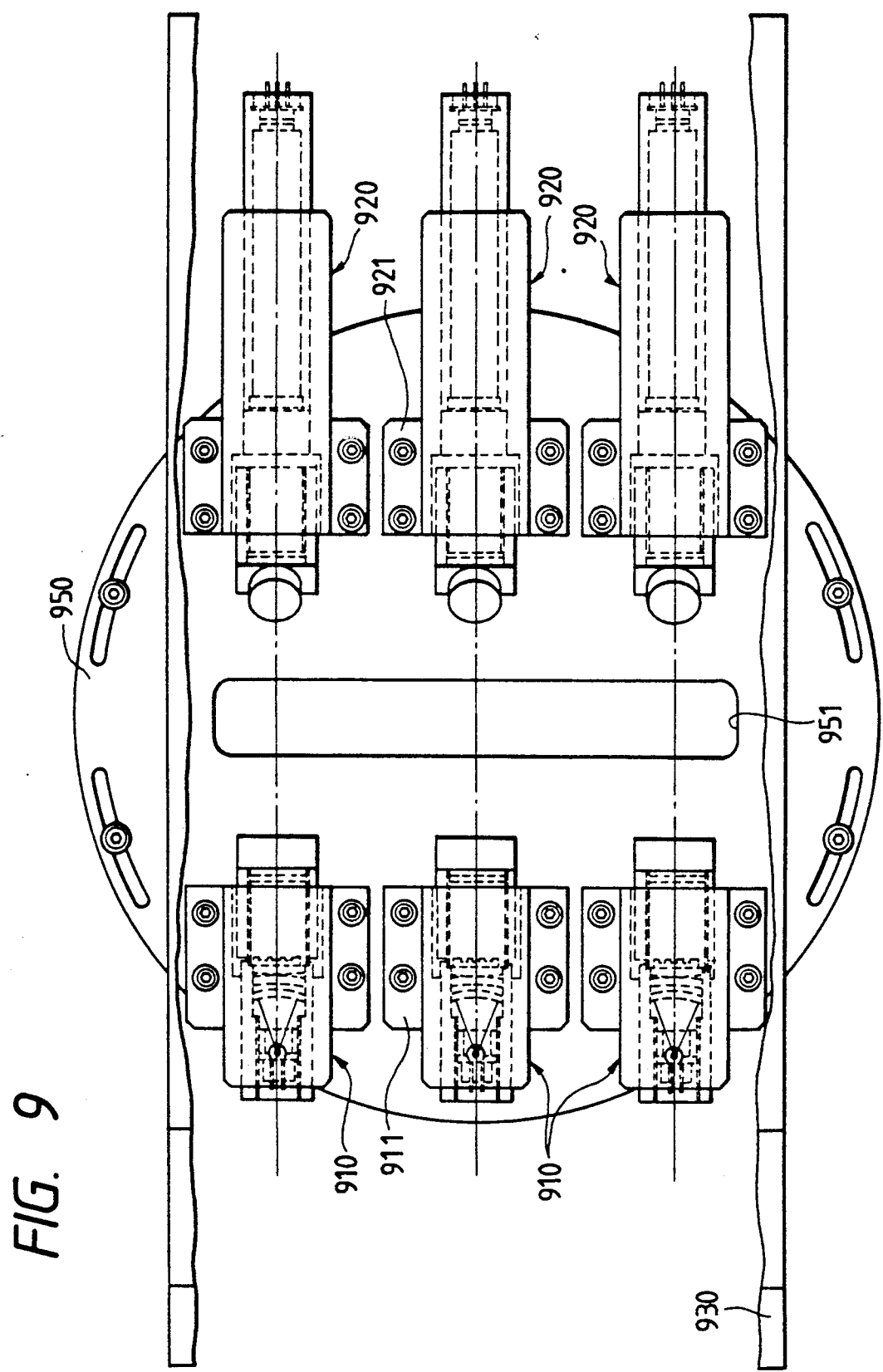
FIG. 9 is a plan view of FIG. 8 as seen looking into the drawing surface.

As shown in FIG. 9 (a plan view of FIG. 8 as seen looking into the drawing surface), each of the light-emitting and light-detecting sections 910 and 920 is composed of three sets which are spaced in the direction of scanning with the pattern drawing beams parallel to the length of the slit 951. This enables the gap between the drawing surface and the focus detecting mechanism to be detected in a vertical direction (as viewed in FIG. 9) at three points on the scanning line (in the example given, the two points substantially on opposite ends of the range of scanning with pattern drawing light and the single point on its center), thereby allowing accurate determination of the gap and the inclination of the drawing surface. On the basis of the results of this determination, the drawing board 300 is moved vertically or tilted to control the position of the waist of the pattern drawing beam so that it coincides with the drawing surface.

Figure 10:
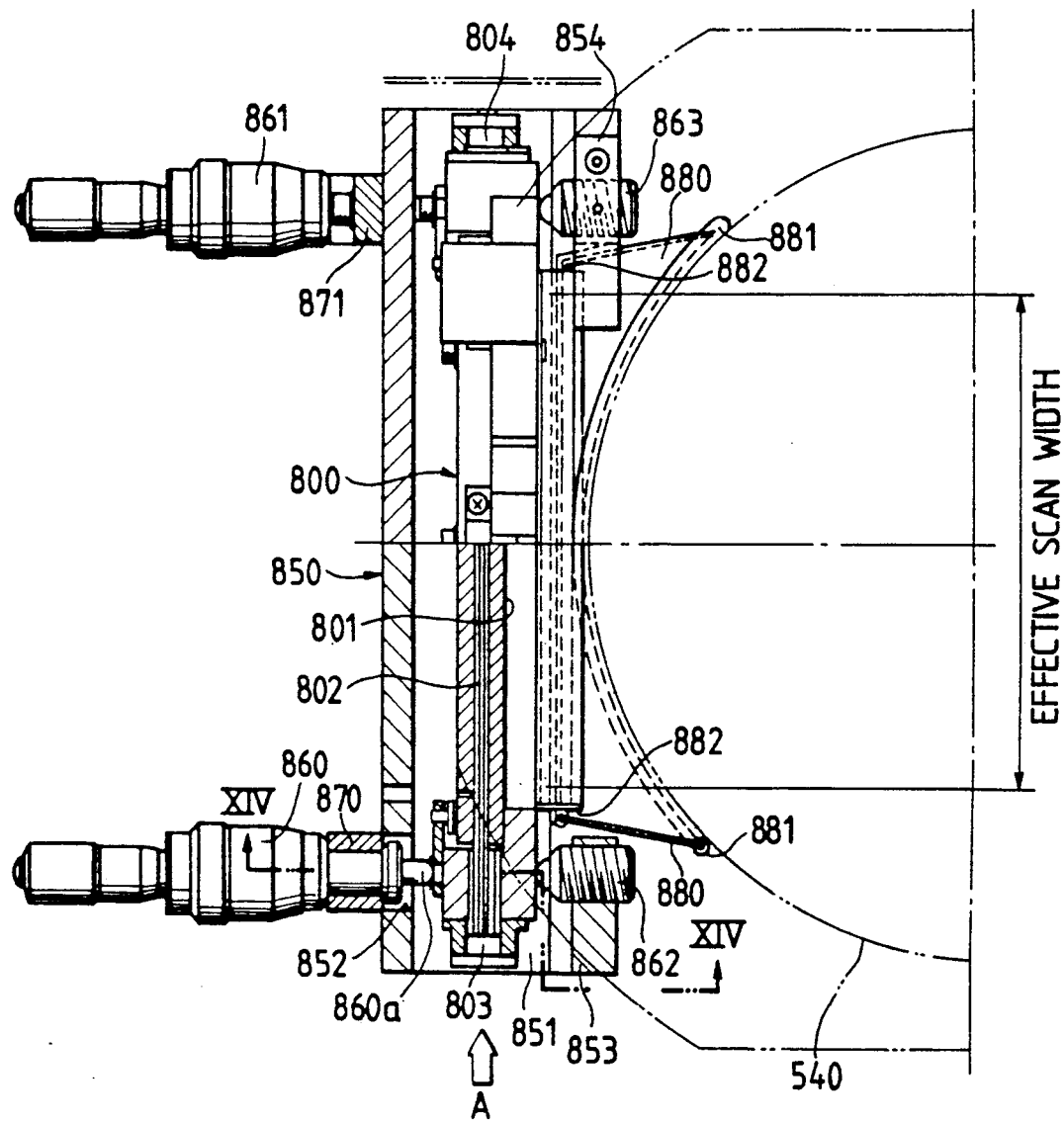
FIG. 10 is a partial fragmentary plan view showing the monitor detecting unit used in the above embodiment of the present invention.

The monitor detecting unit 800 shown by a one-long-and-two-short dashed line in FIG. 8 is shown more specifically in FIG. 10. As is apparent from FIG. 10, this unit is a unitary assembly of a glass scale 801 having slits formed in a stripe pattern at a pitch of 160 $\mu$m on the end face where incident light falls, a fiber bundle 802 composed of plural fluorescent optical fibers, and two PIN photodiodes 803 and 804 provided on opposite ends of the fiber bundle 802.

Monitor light is launched laterally into the fluorescent optical fiber bundle 802 via the scale 801 and propagates through the fiber until it reaches the PIN photodiodes 803 and 804 at opposite ends. When the monitor light scans over the scale 801, the PIN photodiodes produce a sine wave output. The sine wave is shaped to a rectangular wave, which is fed into the control system and used to time the control of the first and second pattern drawing AO modulators 407 and 407' and to control the compensating AO modulator 432 for compensating for the change in the direction of reflected light that occurs on account of the rotation of the polygonal mirror 450 in one plane. It should however be noted that the slit pitch of 160 $\mu$m produces a pulse which is too wide compared to the spot diameter of 5 $\mu$m. To deal with this problem, each pulse is electrically divided to 1/64 of the initial width so that one pulse will be produced in response to scanning over a width of 2.5 $\mu$m.

Monitor light freely passes through ordinary optical fibers. However, fluorescent optical fibers produce fluorescence upon illumination with light, and the resulting fluorescent light propagates through the fibers to reach the PIN photodiodes on opposite ends. Theoretically, a PIN photodiode need only be provided at one end of the fiber bundle, but in order to attain a constant quantity of light irrespective of the position illuminated with the monitor light, a diode is desirably positioned at both ends as in the embodiment under consideration.

Figure 11:
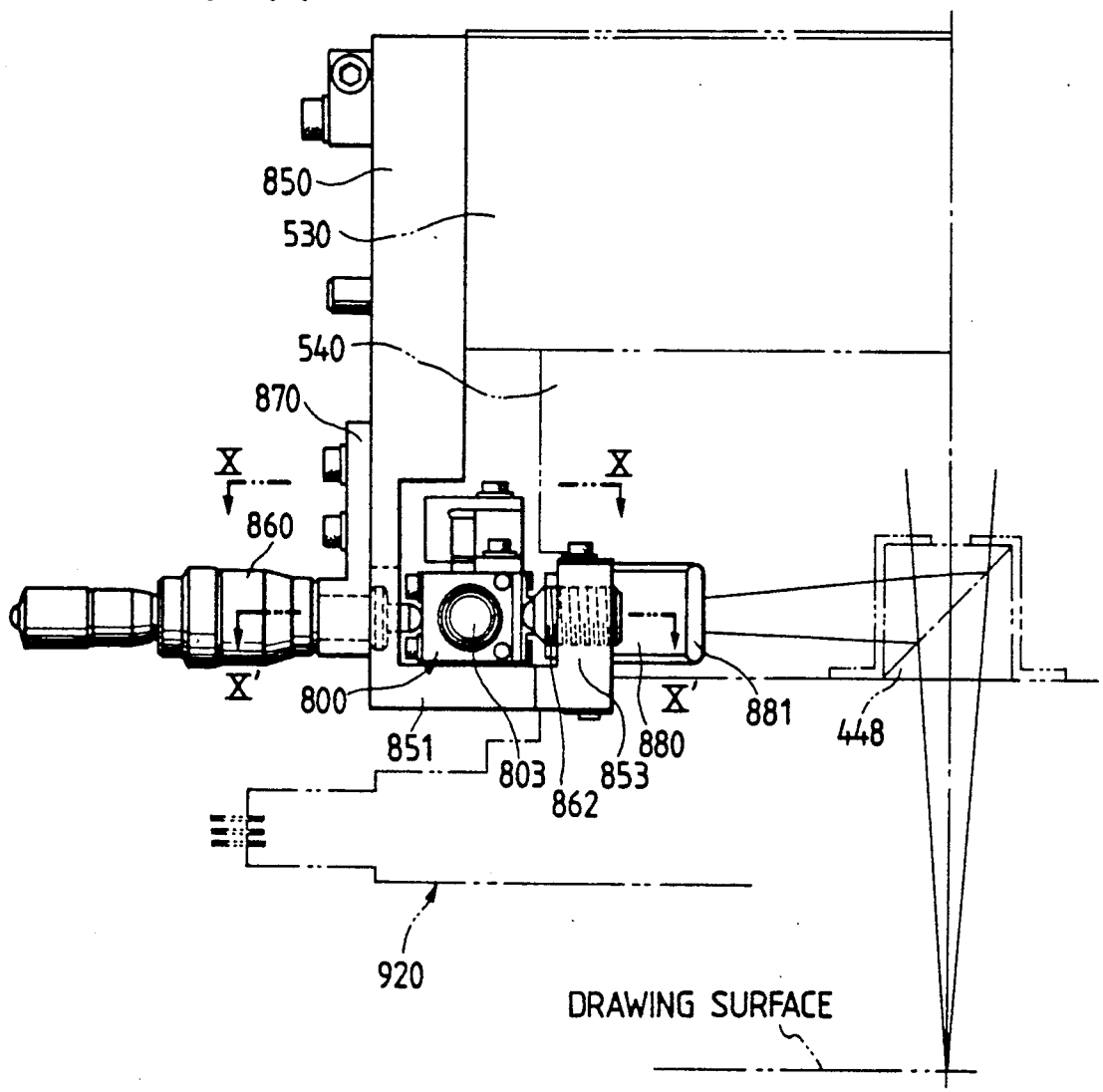
FIG. 11 is a side view of FIG. 10 as seen looking in the direction indicated by an arrow A.

As shown in FIG. 11 (a side view of FIG. 10 as seen looking in the direction indicated by arrow A), the monitor detecting unit 800 is carried on an L-shaped member 851 formed at the lower end of an arm 850 and is positioned by being held between a micrometer head 860 and a spring plunger 862 fixed at one end of the arm 850 and between a micrometer head 861 and a spring plunger 863 fixed at the other end of the arm.

The lower half of FIG. 10 is a cross section of FIG. 11 as seen looking in the direction indicated by arrows X, and the upper half of FIG. 10 is a cross section of FIG. 11 as seen looking in the direction indicated by arrows X'.

The micrometer heads 860 and 861 are secured by fasteners 870 and 871, respectively, which are screwed to the side wall of the arm 850. The spindle 860a of the micrometer head 860 is urged against the monitor detecting unit 800 through a hole 852 formed in the side wall of the arm 850. The spring plungers 862 and 863 are secured by support walls 853 and 854, respectively, which extend upward from the carrying member 851 and press the monitor detecting unit 800 toward the micrometer heads. By adjusting the micrometer head 860 and 861, not only the horizontal position of the monitor detecting unit 800 with respect to the incident direction of light beam but also its inclination in the scanning direction can be adjusted, thereby enabling the fine tuning necessary to insure that the end face of the scale 801 where incident light is admitted will be set at a position equivalent to the drawing surface.

Figure 12:
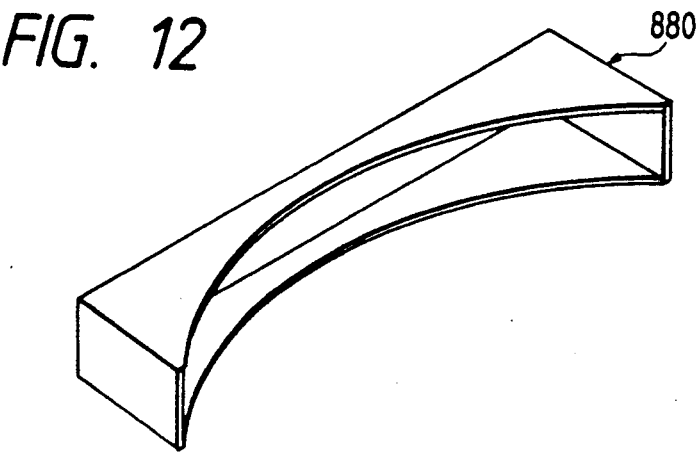
FIG. 12 is a perspective view of a frame member.

Monitor light emerges through the hole 543 in the lower part of the side wall of the lens cover 540, and the monitor detecting unit 800 is positioned to face this through-hole 543 so that it will properly admit the emerging monitor light. A frame member 880 is disposed between the lens cover 540 and the monitor detecting unit 800. As shown in FIG. 12, this frame member is open on both sides in such a way that one side forms an arc following the contour of the lens cover 540, with the other side being linear. Silicone tubes 881 and 882 having cutouts in their side walls are fitted to the respective open sides of the frame member 880 so that their edges are in intimate contact with the lens cover 540 and the arm 850.

Figure 13:
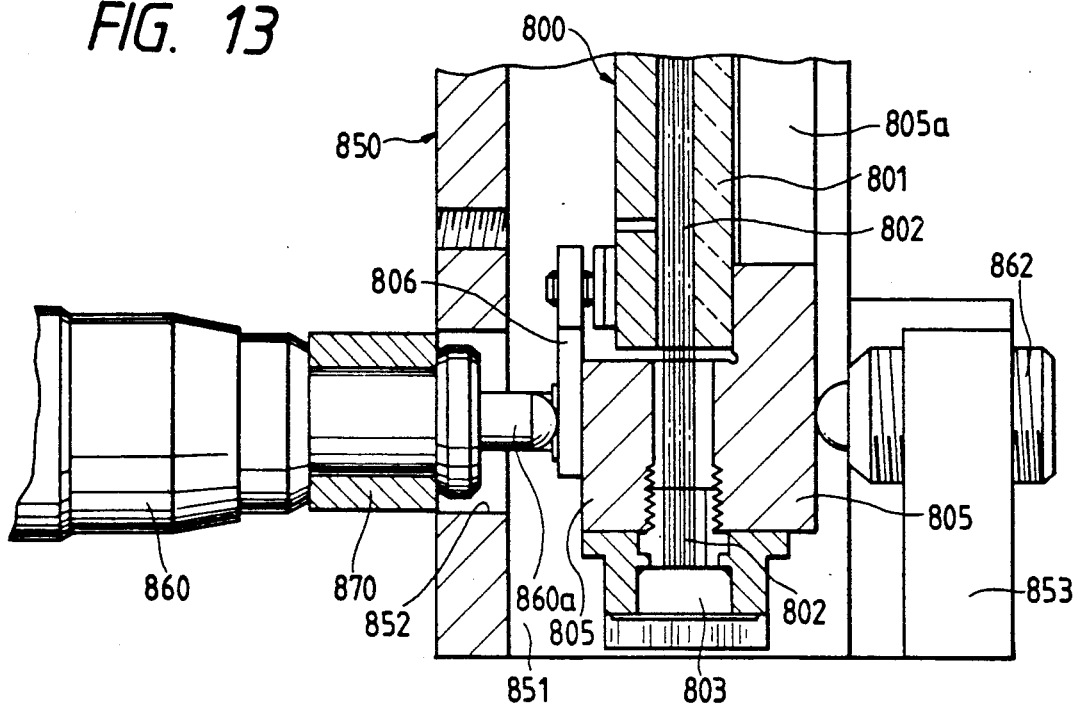
FIG. 13 is a partial enlarged view of FIG. 10.

As shown more specifically in FIGS. 13 and 14, the monitor detecting unit 800 includes a base 805 that has a rectangular hole 805a formed in the front face for permitting the passage of monitor light and which makes direct contact with the micrometer head and the spring plungers, and a compressive plate 807 which presses the scale 801 against the base 805 by the urging force of a leaf spring 806 fixed to the effective portion of the spindle 860a. FIG. 13 is a partial enlarged view of FIG. 10, and FIG. 14 is a cross section of FIG. 10 as seen looking in the direction indicated by arrows XIV.

As shown in FIG. 14, the compressive plate 807 has a ledge-like cutout 807a on the side facing the scale 801, and the corners of this cutout which are the closer to the scale 801 have an inclined surface sloping downward to the scale 801 so as to insure the provision of a space for accommodating the fiber bundle 802. A fastening piece 808 is inserted into the cutout 807a to hold down the fiber bundle 802 from above as seen in FIG. 14. The fastening piece 808 has an inclined surface 808a formed at its end which is symmetrical in space to the inclined surface 807b of the compressive plate 805. The fiber bundle 802 is fixed within the space formed between the two inclined surfaces and the scale and which has a triangular cross section.

When the beam position on the reflecting surfaces of the polygonal mirror changes in response to its rotation, the position of incidence on the $f\theta$ lens will also change, impairing telecentricity in the marginal area. Therefore, unless the positions of the drawing surface and the scale are optically completely equivalent to each other, it is impossible to obtain a monitor signal that has exact correspondence to the actual position of pattern drawing. This deviation is usually too small to become a problem, but in the apparatus being considered where each of the fields to be scanned for pattern drawing is exposed with it being divided into a plurality of lanes, a deviation in the marginal area will cause discontinuity in the pattern on the border between adjacent lanes. In order to deal with this problem, the system of the present invention is so designed that when the position of the polygonal mirror is adjusted, due consideration is given to the possible change in the point of deflection to insure telecentricity at the marginal area of the effective scan width, although telecentricity in the central area may be slightly affected.

What is claimed is:

1. A monitor mechanism for use with a scanning optical apparatus, comprising:
   beam splitter means for dividing light beam from a laser light source into at least one pattern drawing beamlet and a monitor beamlet;
   a phaser provided in an optical path of at least one of said beamlets to rotate the relative directions of polarization of said at least one pattern drawing beamlet and said monitor beamlet so that the directions of polarization of said beamlets are orthogonal to one another;
   a first polarizing beam splitter for synthesizing said at least one pattern drawing beamlet and said monitor beamlet into a single composite beam in the same optical path; and
   a second polarizing beam splitter for separating said single composite beam, after passing through a scanning lens and being deflected by a deflector of said scanning optical apparatus, again into at least one pattern drawing beamlet directed to a drawing surface and a monitor beamlet directed to a monitor detecting system.

2. The monitor mechanism for use with a scanning optical apparatus of claim 1, wherein said beam splitter means comprises a first half-silvered mirror for dividing said light beam from said laser source into first and second parts, said first part being significantly greater in magnitude than said second part, said second part forming said monitor beamlet, and a second beam splitter for dividing said first part into two pattern drawing beamlets of substantially the same amplitude.

3. The monitor mechanism for use with a scanning optical apparatus of claim 1, wherein said phaser comprises a half-wavelength plate disposed in a path of said pattern drawing beamlet.

* * * * *